United States Patent [19]

Sherfield

[11] Patent Number: 5,224,291
[45] Date of Patent: Jul. 6, 1993

[54] HYDROPONIC CULTIVATION APPARATUS AND METHOD

[76] Inventor: Charles O. Sherfield, 1659 E. Hampton, Mesa, Ariz. 85204

[21] Appl. No.: 625,078

[22] Filed: Dec. 10, 1990

[51] Int. Cl.⁵ ........................................... A01G 31/02
[52] U.S. Cl. ........................................................ 47/62
[58] Field of Search ................................... 47/59–64, 47/66, 79, 48.5, 56

[56] References Cited

U.S. PATENT DOCUMENTS

| | | | |
|---|---|---|---|
| 3,352,057 | 11/1967 | Ferrand | 47/1.2 |
| 3,660,933 | 5/1972 | Wong, Jr. | 47/62 |
| 3,766,684 | 10/1973 | Kato | 47/62 |
| 3,925,926 | 12/1975 | Shigeo | 47/62 |
| 4,118,891 | 10/1978 | Kehl et al. | 47/59 |
| 4,211,034 | 7/1980 | Piesner | 47/62 |
| 4,291,499 | 9/1981 | Prewer | 47/56 |
| 4,310,990 | 1/1982 | Payne | 47/59 |
| 4,488,377 | 12/1984 | Sjöstedt | 47/59 |
| 4,833,825 | 5/1989 | Sprung | 47/62 |
| 4,926,584 | 5/1990 | Horibata | 47/61 |
| 4,926,585 | 5/1990 | Deschel | 47/61 |

*Primary Examiner*—Carl D. Friedman
*Assistant Examiner*—Michele A. Van Patten
*Attorney, Agent, or Firm*—Don J. Flickinger; Jordan M. Meschkow; Robert A. Barsons

[57] ABSTRACT

An apparatus which includes a growing container in which plants are hydroponically grown on a support medium is disclosed. The growing container includes a plurality of openings in which seals are installed. The seals include holes through which the plants grow. When seeds are planted, a hollow tube is placed through the seal hole to maintain the seed in position. After the seed germinates, it grows through the tube. As continued growth expands the plant's stem to the size of the tube, the tube breaks apart and does not constrain future plant growth. Moreover, as the plant grows further, the seal hole expands to accommodate the plant stem. The seal surrounds and contacts the plant stem to reduce evaporation of nutrient solution from the growing container and to keep insects and contamination out of the growing container. A holding container is positioned above the growing container and coupled to the growing container through a manifold arrangement. The holding container may be quickly filled with a single, measured nutrient solution charge for the growing container. Then, a valve is opened, and the manifold arrangement slowly distributes the nutrient solution to the growing container where it is substantially absorbed by the support medium and wicked to the vicinity of the plant within the growing container.

17 Claims, 2 Drawing Sheets

HYDROPONIC CULTIVATION APPARATUS AND METHOD

TECHNICAL FIELD OF THE INVENTION

The present invention relates generally to horticultural devices and methods. More specifically, the present invention relates to hydroponic devices and methods which are particularly adapted for outdoor plant cultivation.

BACKGROUND OF THE INVENTION

Hydroponics generally represents the growing of plants in nutrient solutions rather than in natural soil. For many horticultural applications, hydroponics provides significant benefits. For example, greater control may be exerted over the parameters which affect plant growth. Consequently, plant densities, plant growth rates, and product yields may exceed those achievable by cultivating plants in natural soil. Moreover, soil or other environmental conditions in various locations simply prohibit successful cultivation of certain plants. In these situations, such certain plants may be successfully cultivated using hydroponic techniques.

On the other hand, hydroponic techniques conventionally present significant drawbacks. The control of numerous parameters which affect plant performance usually requires a substantial investment in facilities and equipment. Often, hydroponic techniques are practiced indoors, in greenhouses and the like, where plant performance-affecting parameters may be more easily controlled than outdoors. The indoor facility needs, when coupled with elaborate equipment needs, often make such conventional hydroponic techniques prohibitively expensive. In addition, indoor space limitations often restrict the practice of conventional hydroponic techniques to a small scale. Furthermore, elaborate equipment often requires a great amount of human intervention and maintenance in order to achieve successful hydroponic results. Often times, a failure of a single piece of hydroponic equipment results in failure of an entire crop.

Still, in many potential applications some or all of the advantages of hydroponic techniques can be achieved without indoor facilities. Consequently, by practicing hydroponics outdoors many of the cost, space, and other disadvantages are minimized. While outdoor hydroponic systems are known, such conventional outdoor systems fail to adequately answer many of the problems posed by outdoor hydroponics.

For example, in arid climates hydroponics potentially offers great benefits because the successful cultivation of certain desirable plants in arid soil is exceedingly difficult. However, in arid climates evaporation of nutrient solutions becomes a serious problem. Evaporation may take place from a plant itself or directly from hydroponic equipment. Substantial evaporation from hydroponic equipment is especially undesirable because such evaporation may undesirably concentrate remaining nutrient solutions to the detriment of growing plants. Conventional hydroponic equipment fails to adequately retard the effects of evaporation, and consequently, increased maintenance is required to successfully cultivate plants.

In addition, conventional hydroponic equipment fails to adequately protect plant roots and nutrient solutions from insects and other contamination. While this problem is not as severe when equipment is used indoors, it becomes serious when used outdoors. Consequently, constant surveillance and maintenance is required outdoors to guard against infestations and contamination.

Furthermore, many conventional hydroponic devices are elaborate structures which are complicated to build and maintain and are thus undesirably expensive. Accordingly, such equipment is not suitable for outdoor use in applications where the equipment is replicated numerous times for the cultivation of large quantities of plants.

SUMMARY OF THE INVENTION

Accordingly, it is and advantage of the present invention that an improved hydroponic apparatus and plant cultivation technique is provided.

Another advantage of the present invention is that low maintenance hydroponic equipment is provided. Thus, overall expense of operating the present invention is reduced and large numbers of the present invention may be attended to with a minimum amount of human intervention.

Yet another advantage is that the present invention retards evaporation of nutrient solutions. Consequently, the present invention is suitable for use in arid climates without requiring excessive maintenance.

Still another advantage is that the present invention guards against insect infestations and contamination of plant roots and of nutrient solutions. Accordingly, the present invention improves survivability of cultivated plants and reduces required maintenance.

Another advantage is that the present invention is simple to construct and maintain. Thus, the present invention is inexpensive to acquire initially and to operate.

The above and other advantages of the present invention are carried out in one form by an apparatus which hydroponically cultivates a plant while retarding evaporation and protecting plant roots. The apparatus includes a container which is configured to retain a nutrient solution. The container has an opening therein. A seal is positioned within the opening. The seal has a hole which is dimensioned to provide physical contact between the seal and the plant's stem.

The above and other advantages of the present invention are carried out in another form by a method of efficiently cultivating a plant hydroponically. The method positions a seed on a porous support medium which resides within a growing container. The growing container has a seal, and the seal has a hole which is located generally above the seed. The method calls for dispersing a nutrient solution throughout the support medium located within the growing container. The method additionally guides the growth of the plant through the hole in the seal. The stem of the plant is surroundably contacted by the seal. Thus, this surrounding contact retards evaporation of the nutrient solution from the growing container. The seal expands to accommodate the stem as the plant grows.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
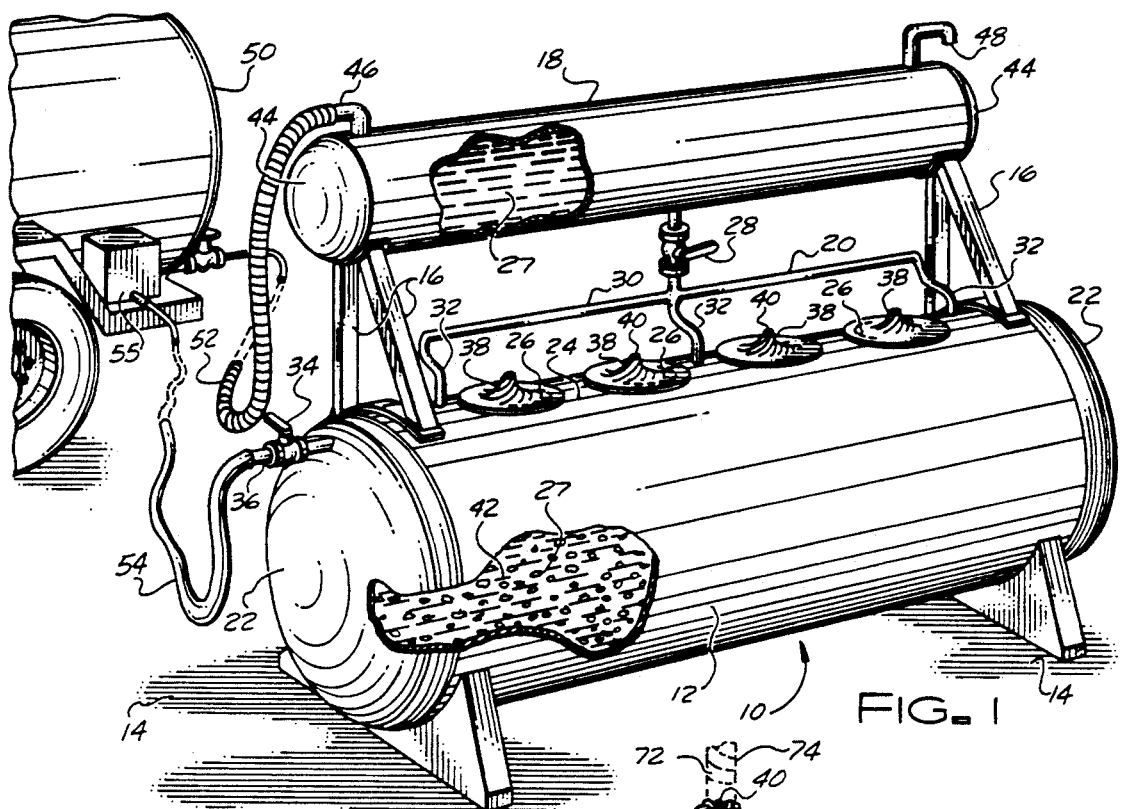
FIG. 1 shows a perspective view of the present invention.

FIG. 1 shows a perspective view of a plant grower 10 constructed in accordance with the teaching of the present invention. Grower 10 includes a growing container 12, which may, but is not required to, reside directly on top of ground 14 in an outdoor environment. Supports 16 position a holding container 18 slightly above growing container 12. A manifold arrangement 20 couples holding container 18 to growing container 12.

Growing container 12 is constructed from a cylindrically shaped pipe, preferably formed from polyvinyl chloride (PVC) or another plastic. Container 12 includes end caps 22 to seal opposing ends of the pipe which forms container 12. An upper region 24 of container 12 includes a plurality of openings 26, which are axially spaced apart from one another in a line on container 12. The precise number of openings 26 is not an important parameter in the present invention. However, openings 26 are spaced apart from one another by at least a distance which corresponds to the maximum density at which the types of plants to be cultivated in grower 10 may be grown. Moreover, the size of openings 26 is sufficiently large to accommodate the stem diameters of mature ones of such plants.

In addition, manifold arrangement 20 couples to container 12 in a plurality of locations in upper region 24. Manifold arrangement 20 serves to selectively and uniformly supply a nutrient solution 27 from holding container 18 to growing container 12. Thus, an inlet of a valve 28 couples to holding container 18, and an outlet of valve 28 couples through a main distribution conduit 30 to each of a plurality of secondary distribution conduits 32. Each of secondary distribution conduits 32 couples to upper region 24 of growing container 12. In the preferred embodiment, manifold arrangement 20 is made from conventional PVC components and is hermetically sealed when valve 28 is in a closed state. When valve 28 is closed, no nutrient solution 27 may pass through manifold arrangement 20, but when valve 28 opens nutrient solution 27 may drain from holding container 18 through manifold arrangement 20 into growing container 12.

Growing container 12 additionally includes an evacuation valve 34, which FIG. 1 shows externally attached to the upper portion of one of an end cap 22. An evacuation tube 36 couples to the opposing side of valve 34 from container 12 and extends away from container 12 for a short distance. The external end of tube 36 is hermetically sealed from the interior of container 12 when valve 34 is shut. However, when valve 34 opens air may be pumped out from the interior of container 12 through valve 34 and tube 36.

Thus, except for openings 26, when valves 28 and 34 are shut the interior of growing container 12 is hermetically sealed from the outside environment. And, as discussed in more detail below, seals 38 are installed within openings 26 to secure openings 26. Generally speaking, a seal 38 hermetically clamps to the entire region of container 12 which surrounds an opening 26. Seal 38 includes a centrally located hole 40 through which a plant grows. As the plant grows, seal 38 surrounds and contacts the plant's stem to reduce evaporation of nutrient solution 27 from container 12 and to keep insects and contamination outside of container 12.

The interior of growing container 12 is substantially filled with an inert support medium 42, which supports seeds and growing plant roots. In the preferred embodiment, support medium 42 is a sponge or like material which exhibits substantial wicking ability so that nutrient solution 27 may be evenly distributed throughout medium 42 in upper region 24 of container 12 and not allows to seep exclusively into the lower section of container 12. Preferably, support medium 42 is a natural sponge, but may also include any porous rubber, cellulose, or other product conventionally recognized and used as a sponge.

Like growing container 12, holding container 18 is constructed from a cylindrically shaped pipe, preferably formed from polyvinyl chloride (PVC) or another plastic. Container 18 includes end caps 44 to seal opposing ends of the pipe which forms container 18. In addition, holding container 18 includes a filler tube 46 and an air escape tube 48 which attach to the upper sections of holding container 18. Moreover, the length and diameter of holding container 18 is selected in relationship to the size of growing container 12 so that when full, holding container 18 holds a predetermined quantity of nutrient solution 27. This predetermined quantity provides a single charge of nutrient solution 27 for growing container 12. This charge of nutrient solution 27 is the maximum quantity of solution 27 which growing container 12 may hold without causing harm to plants growing therein, and is determined empirically.

The apparatus and method of the present invention do not rely on any particular nutrient solution. Thus, any of the nutrient solutions known to those skilled in the art may suitably operate as nutrient solution 27.

In operation a sour 50 distributes nutrient solution 27 to holding tank 18. A tank carried on a truck or trailer may advantageously serve as source 50. Thus, multiple ones of growers 10 may be attended to by sequentially moving source 50 to the multiple growers 10. Preferably, valve 28 is initially shut. Source 50 may quickly fill holding container 18 through a hose 52 because holding container 18 contains no internal structure through which nutrient solution 27 must travel and holding container 18 includes air escape tube 48. Nutrient solution 27 may be driven through hose 52 using either a pump or the force exerted by gravity. In addition, the filling of holding container 18 measures a desired quantity of nutrient solution 27 for application to growing container 12. Simultaneously, a hose 54 is coupled between a pump 55 on source 50 and evacuation tube 36. When evacuation valve 34 is opened, air may be evacuated from the interior of growing container 12. As discussed below, seals 38 collapse around the stems of plants growing in growing container 12 to substantially prevent air leakage into container 12.

After holding container 18 has been filled with nutrient solution 27 and air has been sufficiently evacuated from within growing container 12, valve 28 is then be opened. Consequently, nutrient solution 27 slowly drains into growing container 12 through manifold 20. Since manifold arrangement 20 couples to a plurality of points on growing container 12, nutrient solution 27 is distributed even within growing container 12. Moreover, since air has been evacuated from container 12, air pockets within container 12 and support medium 42 are minimized. Consequently, support medium 42 evenly absorbs and distributes nutrient solution 27. After the contents of holding container 18 have drained into growing container 12, valve 28 may be closed, then holding container 18 may optionally be filled again with nutrient solution 27 for future use.

Figure 2:
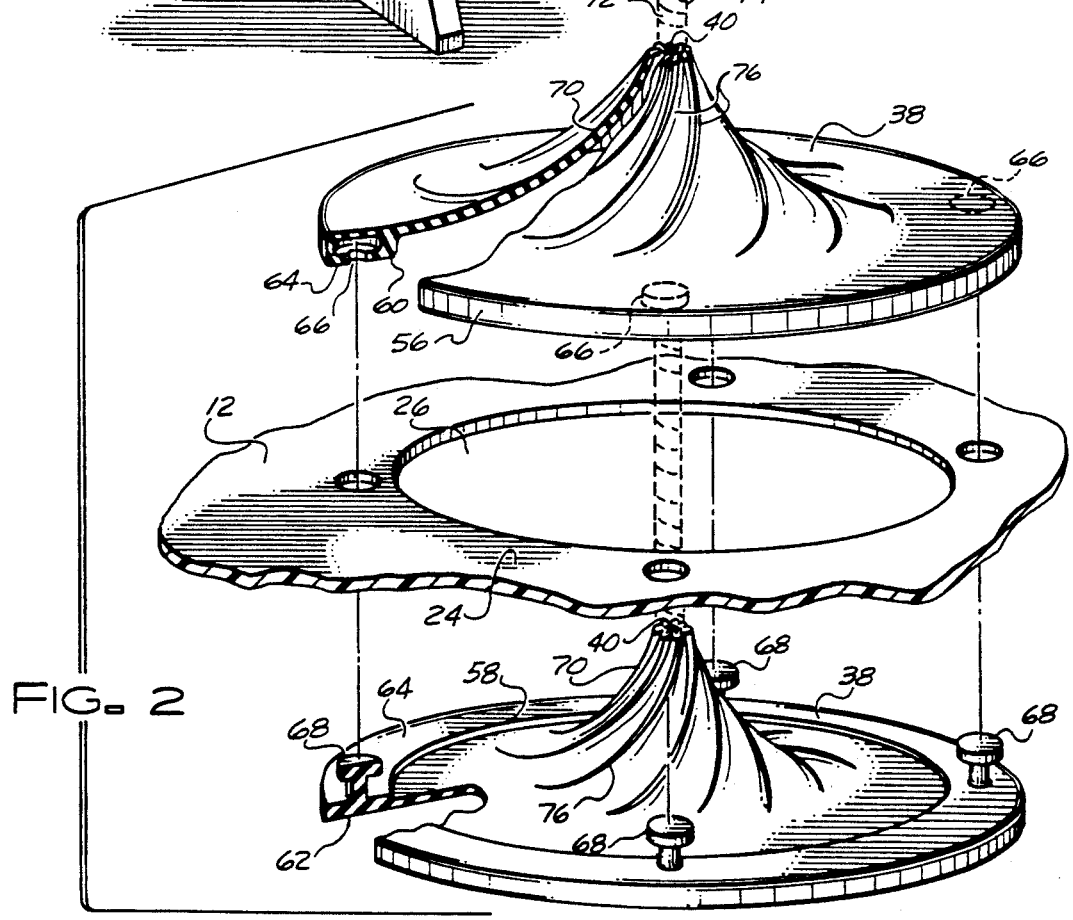
FIG. 2 shows an exploded perspective view of a preferred seal utilized in the present invention.

FIG. 2 shows an exploded perspective view of a preferred seal 38 used in connection with grower 10. Specifically, seal 38 includes a top section 56 which mates with a bottom section 58. Top and bottom sections 56-58 include bases 60 and 62, respectively. Bases 60-62 are ring-shaped to conform to the section of growing container 12 which immediately surrounds opening 26. The bottom of top base 60 and the top of bottom base 62 support gaskets 64 which help to hermetically attach seal 38 to container 12. In addition, the bottom of top base 60 includes bottom-facing snap fastener socket members 66 while the top of bottom base 62 includes top-facing snap fastener plug members 68. As indicated in FIG. 2, top base 60 is placed outside of container 12 around opening 26 while bottom base 62 is placed inside container 12 around opening 26. Next, bases 60-62 are snapped together by inserting plug members 68 through separately bored holes or through opening 26 into socket members 66. The snapping together of bases 60-62 causes bases 60-62 to tightly clamp container 12 between gaskets 64. Consequently, a substantially hermetic attachment results between bases 60-62 and container 12.

In the preferred embodiment, each of top and bottom sections 56-58 of seal 38 includes a membrane 70, which extends from the interior of ring-shaped bases 60-62 inward to seal hole 40. Preferably, membrane 70 is formed from an impermeable, weather-resistant, resilient material, such as rubber. Thus, as a plant 72 matures and its stem 74 expands, hole 40 expands to accommodate stem 74. Each of top and bottom sections 56-58 includes a membrane 70 to provide double protection against seal failure.

Moreover, in the preferred embodiment, membrane 70 is configured to slope upward toward hole 40 from base 60 or 62 when installed on container 12. In order to achieve this three dimensional shape, excess material from membrane 70 is gathered up in pleats 76, which extend from base 60 or 62 toward hole 40. As pleats 76 approach hole 40, increased amounts of membrane 70 material are gathered in pleats 76. Thus, as plant stem 74 expands, hole 40 expands without tightly gripping plant stem 74. The upward slope of membrane 70 guides insects and other debris away from plant stem 74. However, when air is evacuated from growing container 12, as discussed above, lowered pressure within container 12 urges membrane 70 to tightly grip plant stem 74 temporarily to secure the seal against stem 74.

Figure 3:
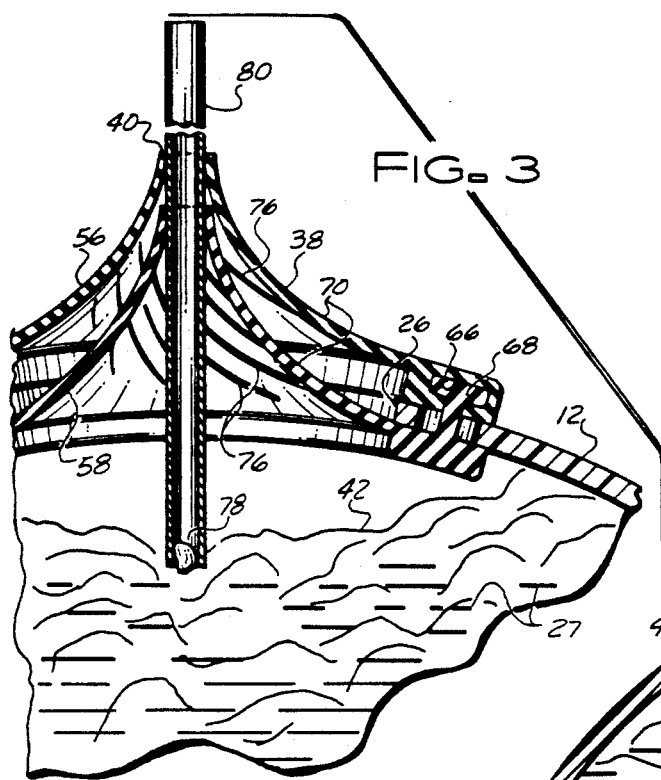
FIG. 3 shows a cross sectional view of the present invention at a planting stage of growth.

FIG. 3 shows the operation of the present invention at a planting stage in the life cycle of plant 72. Thus, plant 72 is merely a seed 78. As discussed above, container 12 contains nutrient solution 27, which has been absorbed upward by support medium 42. A hollow tube 80, such as a conventional drinking straw, has been inserted into growing container 12 through hole 40 in seal 38. Tube 80 has been inserted until one of its ends contacts support medium 42 within container 12. The other of its ends extends out from seal 38. Preferably, hole 40 is sufficiently small that it contacts tube 80. Tube 80 functions to keep seed 78 in place directly underneath hole 40 so that it cannot easily be dislodged from its resting place and so that its future growth will be guided out through hole 40. In addition, tube 80 preferably has transparent walls so that it channels light down to seed 78 to enhance germination of seed 78.

Figure 4:
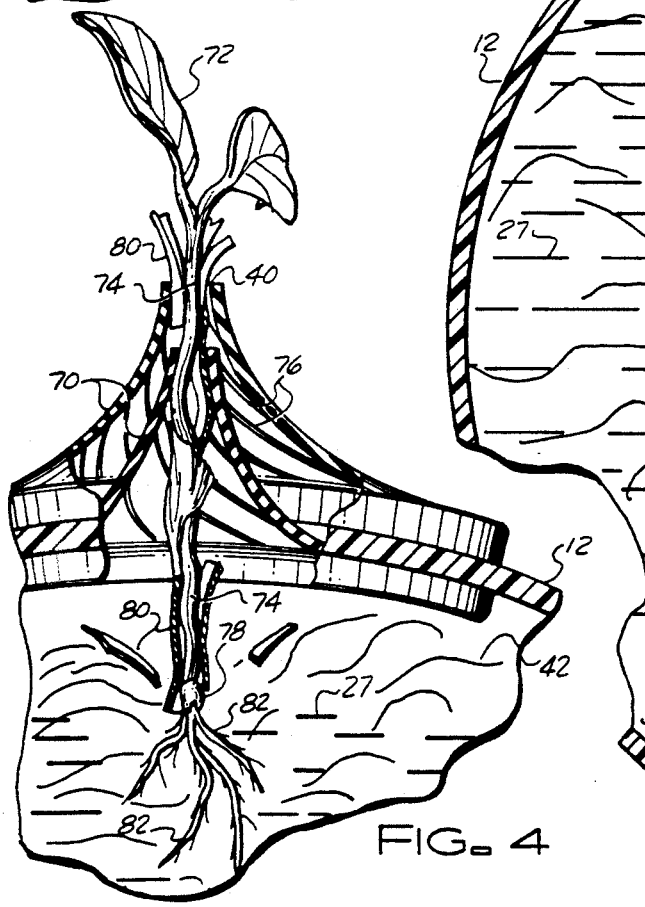
FIG. 4 shows a partial cross sectional view of the present invention after an initial growth stage.

FIG. 4 shows the operation of the present invention after an initial growth stage in the life cycle of plant 72. Thus, plant seed 78 has sprouted and a small stem 74 has now grown through tube 80. In addition, small roots 82 have formed and are anchoring plant 72 in place on support medium 42.

At the stage of development illustrated in FIG. 4, the small diameter of tube 80 does not restrict growth of plant 72. However, as plant 72 continues to grow, its stem 74 expands. In the preferred embodiment, tube 80 is constructed from a material, such as paper or a biodegradable plastic, which easily breaks apart. Thus, by the time plant 72 reaches the growth stage where tube 80 would otherwise impede growth, tube 80 naturally breaks apart and such growth is not impeded.

Figure 5:
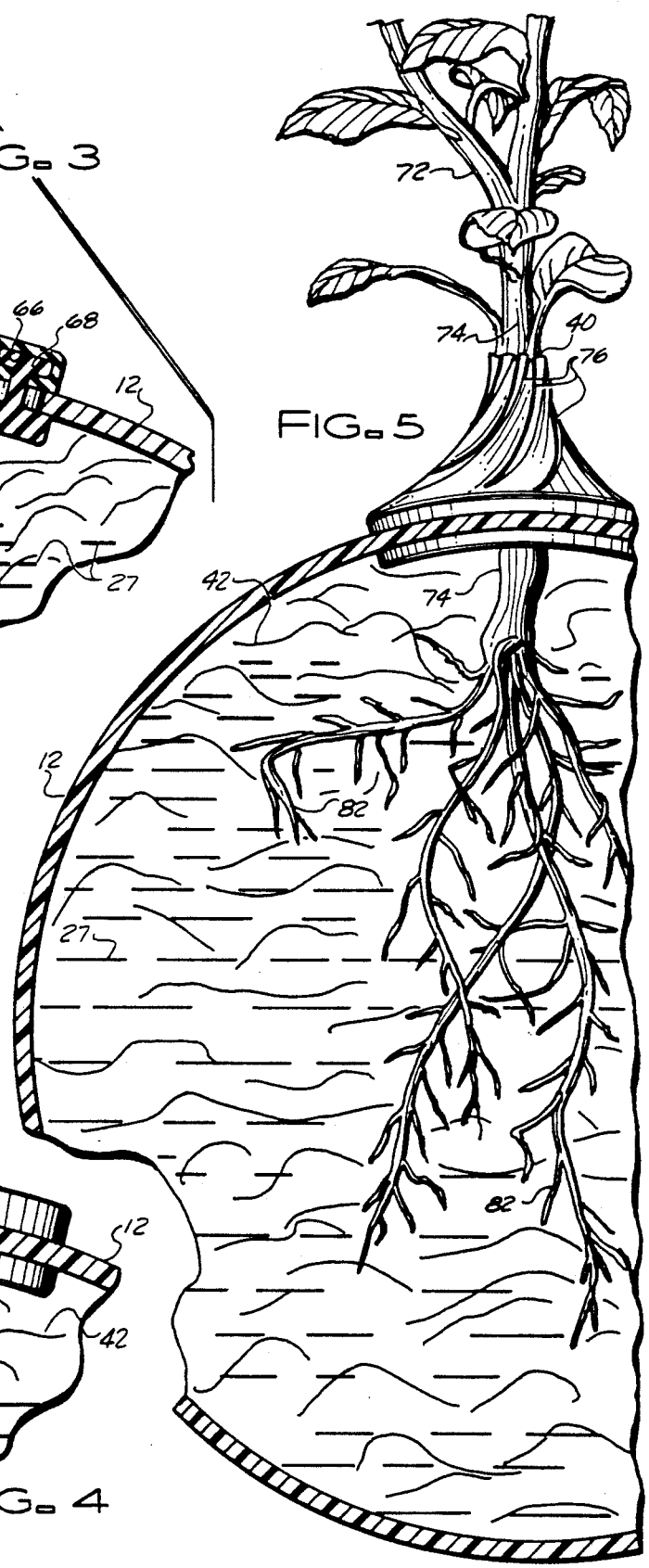
FIG. 5 shows a partial cross sectional view of the present invention in connection with a mature plant.

FIG. 5 shows the operation of the present invention as plant 72 reaches a mature stage in its life cycle. As illustrated in FIG. 5, tube 80 has completely broken apart and no longer surrounds stem 74. Plant 72 has grown so that stem 74 is now much larger than the diameter of tube 80. In addition, as stem 74 has expanded, hole 40 in seal 38 has expanded to accommodate the growth in plant 72.

In summary, the present invention provides an improved hydroponic apparatus and plant growing technique. The apparatus of the present invention is constructed from inexpensive components. Moreover, plants growing outdoors within the apparatus of the present invention need less maintenance because seals are provided to reduce evaporation, insect infestation, and other contamination. In addition, a structure is provided so that nutrient solution may be delivered quickly. As a result, a large number of plants may be attended to in a short period of time and at low cost.

The present invention has been described above with reference to a preferred embodiment. However, those skilled in the art will recognize that changes and modifications may be made in this preferred embodiment without departing from the scope of the present invention. For example, the present invention may be buried underground for aesthetic or other reasons. An addition, additional provisions may be provided for draining nutrient solutions from the containers of the present invention. These and other changes and modifications which are obvious to those skilled in the art are intended to be included within the scope of the present invention.

What is claimed is:

1. An apparatus for hydroponically cultivating a plant having roots and a stem and for retarding evaporation while protecting said plant roots and for fostering growth of a seed into said plant, said apparatus comprising:

a container adapted to retain a nutrient solution, said container having an opening therein;

a seal configured for positioning within said opening, said seal having a hole therein, said hole being dimensioned for physical contact between said seal and said plant stem;

a porous support medium located within said container proximate said opening; and a hollow tube positionable within said seal hole, said hollow tube being sufficiently long to contact said support medium while projecting outward from said container through said seal hole, said hollow tube being for retaining said plant seed in position relative to said seal hole and for guiding growth of said plant through said seal hole.

2. An apparatus as claimed in claim 1 wherein said hollow tube is constructed from a material which breaks apart as said plant grows.

3. An apparatus as claimed in claim 1 wherein said hollow tube transmits light to enhance germination of said seed.

4. An apparatus for hydroponically cultivating a plant having roots and a stem and for retarding evaporation while protecting said plant roots, said apparatus comprising:
 a container adapted to retain a nutrient solution, said container having an opening therein; and
 a seal configured for positioning within said opening, said seal having a hole centrally located therein, said seal being formed from a membrane having expandable pleats extending outward from said hole, said hole being dimensioned for physical contact between said seal and said plant stem, and said pleats being expandable to permit said hole to expand without tightly gripping said plant stem.

5. An apparatus for hydroponically cultivating a plant having roots and a stem for retarding evaporation while protecting said plant roots, said apparatus comprising:
 a container adapted to retain a nutrient solution and including an upper region having an opening located therein; and
 a seal configured for positioning within said opening and having a hole therein being dimensioned for physical contact between said seal and said plant stem, said seal having an upward slope from said container to said seal hole, said upward slope of said seal operating to prevent collection of extraneous objects near said seal hole.

6. An apparatus as claimed in claim 5 additionally comprising a porous support medium located within said container proximate said opening.

7. An apparatus as claimed in claim 6 wherein said support medium comprises a sponge.

8. An apparatus as claimed in claim 5 wherein said seal comprising a resilient material configured so that said seal hole expands to accommodate growth of said plant.

9. An apparatus as claimed in claim 5 wherein said seal is removably attachable to said container.

10. An apparatus as claimed in claim 9 wherein said seal achieves a substantially hermetic attachment to said container.

11. An apparatus as claimed in claim 5 wherein said container comprises:
 a first valve adapted for selective transmission of said nutrient solution into said container; and
 a second valve adapted for selective evacuation of air from said container to enhance distribution of said nutrient solution within said container.

12. A system for hydroponically cultivating seeds into corresponding plants having roots and stems and for retarding evaporation while protecting said roots, said system comprising:
 a growing container adapted to retain a nutrient solution, said growing container having a plurality of openings located in an upper region thereof;
 a porous support medium located within said container proximate said openings;
 a plurality of seals, wherein, for each sea:
  said seal is positioned within one of said openings, and
  said seal has a hole dimensioned for physical contact between said seal and one of said plant stems; and
 a plurality of hollow tubes, each of which are positionable within one of said seal holes wherein for each of said hollow tubes;
  said hollow tube is for retaining one of said plant seeds in position relative to one of said seal holes and for guiding growth of one of said plants through said one of said seal holes,
  said hollow tube is sufficiently long to contact said support medium while projecting outward from said container through said one of said seal holes,
  said hollow tube is constructed from a material which breaks apart as said one of said plants grows therein, and
  said hollow tube transmits light to enhance germination of said one of said seeds.

13. A system as claimed in claim 12 additionally comprising:
 a holding container positioned above and growing container, said holding container being dimensioned to hold a predetermined quantity of said nutrient solution, said predetermined quantity being approximately that quantity which supplies a single, complete charge of said nutrient solution to said growing container;
 a conduit coupled between said holding container and said growing container; and
 a valve, coupled to said conduit, for selectively transmitting said nutrient solution between said holding container and said growing container.

14. A system as claimed in claim 13 additionally comprising a second conduit coupled between said growing container and one of said holding container and said valve, said conduit and said second conduit coupling to said growing container at spaced apart locations on said growing container to evenly distribute said nutrient solution within said growing container.

15. A system as claimed in claim 13 wherein said growing container additionally comprises a second valve adapted for selectively evacuation of air from said growing container to enhance distribution of said nutrient solution within said container.

16. A method of efficiently and hydroponically cultivating a plant, said method comprising the steps of:
 positioning a seed on a porous support medium container within a growing container, said growing container having an expandable seal with a seal hole located generally above said seed;
 dispersing a nutrient solution throughout said support medium within said growing container;
 guiding growth of said plant from said seed through said seal hole including inserting a hollow tube through said seal hole to said support medium within said growing container so that said seed resides within said tube;
 surroundably contacting a stem of said plant with said seal, said surrounding contact between said plant stem and said seal serving to retard evaporation of said nutrient solution; and expanding said seal hole to accommodate growth of said plant.

17. A method as claimed in claim 16 wherein said dispersing step comprises the steps of:

evacuating a substantial portion of air from within said growing container;

placing a predetermined quantity of said nutrient solution in a holding container located generally above said growing container; and draining said nutrient solution from said holding container into said growing container.

* * * * *

UNITED STATES PATENT AND TRADEMARK OFFICE
CERTIFICATE OF CORRECTION

PATENT NO. : 5,224,291
DATED : July 6, 1993
INVENTOR(S) : Charles O. Sherfield It is certified that error appears in the above-identified patent and that said Letters Patent is hereby corrected as shown below:

On the Title page, in the Attorney, Agent or Firm name, Change "Barsons" to --Parsons--.

In column 2, line 13, delete "and" and insert --an--.

In column 4, line 41, delete "sour" and insert --source--.

In claim 12, column 8, line 6, delete "sea' and insert --seal--.

In claim 13, column 8, line 29, delete "and" and insert --said--.

In claim 16, column 8, line 56, delete "container" and insert --contained--.

Signed and Sealed this

First Day of February, 1994

*Attest:*

BRUCE LEHMAN

*Attesting Officer*  *Commissioner of Patents and Trademarks*